United States Patent [19]

Seeburger

[11] Patent Number: 5,036,274
[45] Date of Patent: Jul. 30, 1991

[54] METHOD OF MONITORING THE PATH OF AN ANNULAR BLADE THROUGH A SEMICONDUCTOR MATERIAL

[76] Inventor: Helmut Seeburger, Robert-Koch-Strasse 152, 8263 Burghausen, Fed. Rep. of Germany

[21] Appl. No.: 480,758

[22] Filed: Feb. 16, 1990

[30] Foreign Application Priority Data

Mar. 3, 1989 [DE] Fed. Rep. of Germany ....... 3907321

[51] Int. Cl.$^5$ .............................................. G01B 7/14
[52] U.S. Cl. ................................................ 324/207.16
[58] Field of Search ..................... 324/207.11, 207.16, 324/207.26, 207.22, 66, 67, 226, 225, 236, 239, 238, 326–329

[56] References Cited

U.S. PATENT DOCUMENTS

| 4,198,006 | 4/1980 | Rolfe .............................. 324/207.16 |
| 4,205,797 | 6/1980 | Bennett, Jr. et al. ............... 324/228 |
| 4,438,754 | 3/1984 | Nanny et al. ...................... 324/226 |

FOREIGN PATENT DOCUMENTS 0299451 7/1987 European Pat. Off. .
2637413 2/1978 Fed. Rep. of Germany .

OTHER PUBLICATIONS

Proceedings of the IEEE, vol. 70, No. 5, 05/1982, New York, U.S., pp. 420–457, Kurt E. Peterson; "Silicon as a Mechanical Material", p. 421, last para.
55-124271 12/13/80 Patent Abstracts of Japan, vol. 181, No. 4 (E-037).

*Primary Examiner*—Kenneth A. Wieder
*Assistant Examiner*—Warren S. Edmonds

[57] ABSTRACT

A plurality of eddy-current sensors are provided with covers made of silicon on the side thereof facing the saw blade, the sensors being disposed in a fixed position relative to the saw blade and at a distance from the side face saw blade which is greater than the intended wafer thickness.

10 Claims, 2 Drawing Sheets

METHOD OF MONITORING THE PATH OF AN ANNULAR BLADE THROUGH A SEMICONDUCTOR MATERIAL

FIELD OF THE INVENTION

The invention relates to a method of monitoring the path of a cut when sawing semiconductor material, in particular silicon, into wafers with an annular blade, in which method at least one eddy-current sensor situated in a fixed position relative to the saw blade is used.

BACKGROUND OF THE INVENTION

In sawing rods or blocks of semiconductor material, in particular silicon, into thin wafers typically 0.1 to 1 mm thick, use is primarily made of annular saw blades since the high requirements relating to the geometrical quality of the wafers can best be met therewith. The saw blade has a cutting edge which is usually a matrix of metal such as, for example, nickel in which grains of a hard material such as, for instance, diamond are embedded and which affect the actual removal of material, which matrix surrounds the annular hole. However, even with such annular saw blades, the saw blade exhibits deviations from the desired line of cut on its path through the workpiece in the course of the sawing operation. Consequently, some of the wafers obtained exhibit geometrical faults such as thickness variation, and warp or bow to a greater or lesser degree. With ever increasing requirements being imposed by the manufacturers of electronic components on the wafer geometry, this results in an increasing number of wafers which are excluded from further processing owing to geometrical defects.

In order to avoid such losses, use is being made to an increased extent of processes in which this deviation of the saw blade from the desired specified line of cut during the sawing operation can be smoothed out as, for example, by exerting regulating forces on the saw blade. However, a prerequisite for this is that high performance processes are available which make it possible to monitor the path of cut with high accuracy during every sawing operation.

At present, eddy-current sensors are mainly used for this purpose. The basic principle of measurement is that the sensor induces, by means of a coil with a high-frequency alternating current flowing through it, eddy-currents in the saw blade of the annular saw which in turn produces, as a function of the sensor/saw blade distance, changes in impedance from which a voltage change proportional to this distance can ultimately be derived. Normally one or more sensors are installed in a fixed position relative to the saw blade and register the changes in distance from the saw blade during sawing which can be converted into regulating pulses for smoothing out the deviations, possibly via a control unit.

A disadvantage in the case of these monitoring methods using conventional eddy-current sensors is their susceptibility to malfunction when exposed to the cooling lubricant, in most cases water containing surfactants, which are indispensable when sawing with an annular saw blade. In the sawing operation, this is injected into the sawed slit and during this process is entrained in varying amounts by the saw blade, and is also distributed more or less heavily over the side faces thereof, which may result in an appreciable error in the distance values measured. This troublesome effect is particularly crucial in those positions which are actually best suited for the monitoring namely, when it is intended to track the path of the cut through the wafer being produced. In this case, reliable measured values are no longer obtained with the conventional sensors. This is particularly disadvantageous if regulation or correction measures are undertaken at the saw blade or the workpiece on the basis of these values which may result in serious errors and malfunctions, especially in the case of automated processes.

SUMMARY OF THE INVENTION

It is, therefore, an object of this invention to provide a method which avoids the aforesaid problems and makes it possible, in particular, to monitor the saw blade through the water being produced and on its path inside the workpiece. It is another object of this invention to provide eddy-current sensors which are suitable for carrying out the method and which are also suitable, in particular, for use in automated processes.

In accordance with the present invention, a method is provided for monitoring the path of a cut when sawing semiconductor material in which one or more sensors are provided with a cover made of semiconductor material on the side facing the saw blade.

Surprisingly, it was in fact found that, in the case of sensors provided with a cover of this type, the measurement results used to monitor the path of cut are no longer affected and distorted by water and/or a cooling lubricant.

BRIEF DESCRIPTION OF THE DRAWINGS

FIG. 1 hows an embodiment of the invention employing a single eddy-current sensor in which a rod 1 of semiconductor material is cemented on a cutting strip 2. The rod 1 of semiconductor material is sawed by the action of the cutting edge 3 of an annular saw blade 4. As shown in FIG. 1, the blade 4 has partially passed through the rod 1 to thereby form a hole 12. Once the blade passes through the rod 1 it will form a semi-conductor wafer 5.

Figure 1:
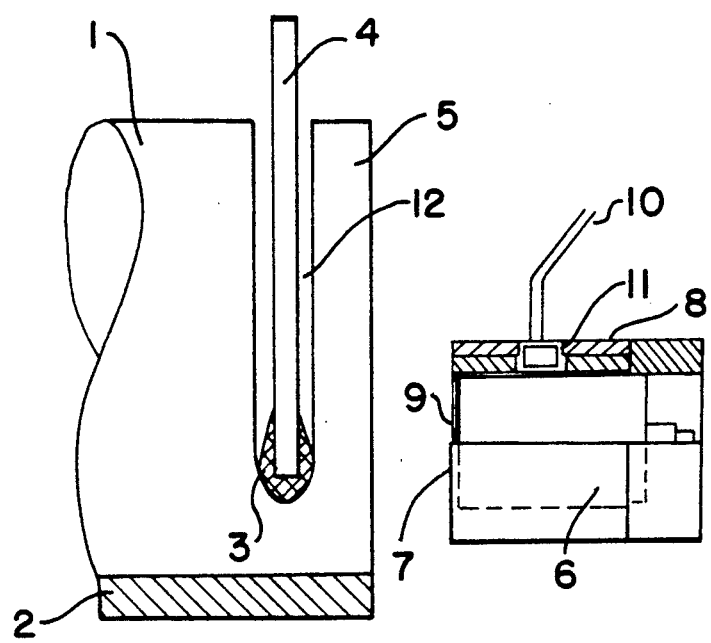
FIG. 1 is a partial sectional view of an embodiment of the apparatus of the present invention employing a single eddy-current sensor.

An eddy-current sensor 6 is shown arranged in a measuring position. The end face 9 of the eddy-current sensor which faces the saw blade is provided with a cover 7 in accordance with the present invention made out of a semiconductor material. The portion of the sensor which does not face the saw blade 4 may be covered by an encapsulating means 8 and a cover 11, preferably made of a polymeric material. Lead wires 10 are connected to the eddy-current sensor from a source of power (not shown).

Figure 2:
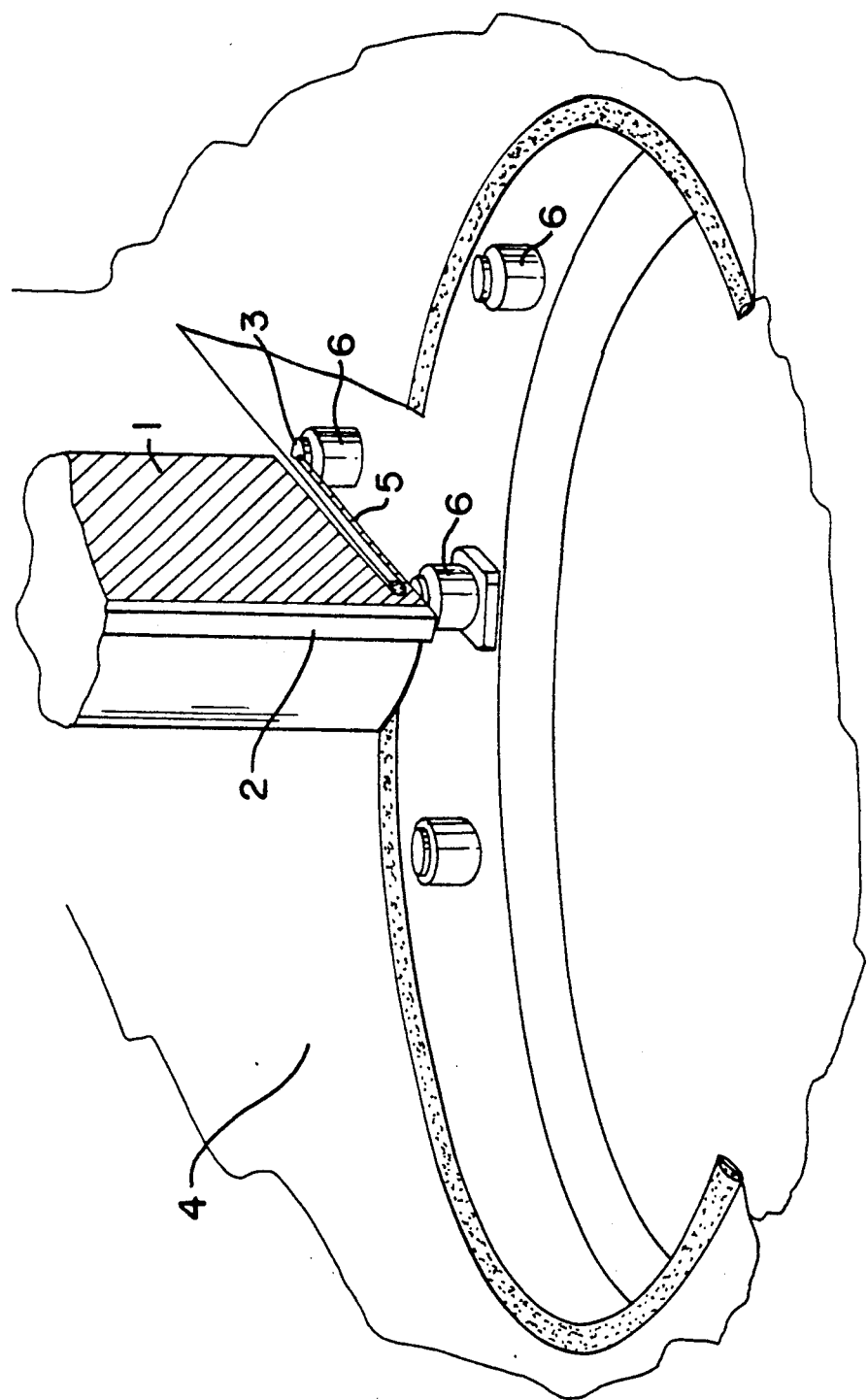
FIG. 2 is a partial sectional view of another embodiment of the apparatus of the present invention employing multiple eddy-current sensors.

Referring to FIG. 2, there is shown an embodiment of the invention employing multiple eddy-current sensors 6. Each of the sensors 6 is positioned in a measuring position enabling the measurement of the distance from the eddy-current sensor 6 to the blade 4 as the blade 4 passes through the rod 1 to form a wafer 5. The distance is converted into a signal by the eddy-current sensor 6 to allow the adjustment of the position of the blade ion the event that the blade 4 deviates from its linear path through the rod 1.

Having described specific preferred embodiments of the invention with reference to the accompanying drawings, it will be appreciated that the present invention is not limited to the precise embodiments, and that various changes and modifications can be effected therein by one of ordinary skill in the art without departing from the sphere or the scope of the invention as defined by the appended claims.

DETAILED DESCRIPTION OF THE INVENTION

The semiconductor material used for the cover is preferably silicon, although in principle, other materials based on elementary or compound semiconductors such as, for example, germanium, gallium arsenide, indium phosphide or cadmium telluride are suitable. Advantageously, the material is used in highly doped form with a specific resistance range of up to about 35 $\Omega$.cm. Preferably, a resistance range of about 0.01 to 30 $\Omega$.cm has proved satisfactory in the case of silicon covers. At the same time, the material may have either a p-type doping or an n-type doping. Thus, silicon doped, for example, with boron or with phosphorus, is equally well suited. Preferably, semiconductors having a monocrystalline form are utilized, even though this is not mandatorily specified, and in principle, multicrystalline or polycrystalline materials which are composed of correspondingly larger or smaller crystallites, can also be used.

Good results were obtained with covers whose thickness is between about 100 and 1,000 $\mu$m, and advantageously, about 200 to 500 $\mu$m, and as uniform as possible. This thickness range is usual in the wafers used in semiconductor technology, for example, for producing solar cells or highly integrated components, which also exhibit only a slight thickness variation. Expediently, such wafers are therefore also used as the starting material for the cover, the size possibly having to be matched to the dimensions of the sensor face to be covered by a shaping operation such as, for instance, grinding or sawing. Wafers having in particular, a surface polished on one or both sides, and also a sawed, lapped, ground or etched surface are suitable. The thickness ranges are, however, not mandatorily specified. In principle, it is also possible to use thinner or thicker covers compared with these ranges, the possible lower limit being set by the mechanical robustness and the possible upper limit by the radius of action of the sensor. In principle, the use of covers whose surfaces are not plane-parallel but are, for example, of wedge-shaped, concave or convex constructions are also conceivable.

An advantage of the invention is that known, commercially available eddy-current sensors can easily be converted in an appropriate manner. For this purpose, the intended cover needs only to be mounted on the side of the sensor facing the object being measured, for example, adhered to, clamped on or screwed on. Expediently, the cover is fitted directly onto the insulating layer which normally covers the actual sensor coil, but in principle, a clear gap may also be provided between the cover and coil. Beneficially, use is made of sensors of encapsulated construction which are provided, for example, on their sides facing away from the object being measured with a casing, for example, made of plastic since, according to experience, they are particularly robust and not susceptible to interference. It has also proved advantageous if the diameter of the cover is larger than that of the sensor coil so that the periphery of the mounted cover projects beyond the periphery of the coil, with the coil and cover preferably being arranged concentrically. In this case, values corresponding, in particular, to about 1.01 to 2.5 times the coil diameter have proved satisfactory. It has been found that this design results in a particularly beneficial configuration of the electromagnetic alternating field, which configuration has little susceptibility to interference. Particularly good results can also be achieved by connecting the cover to the sensor with a short circuit to ground, which can be achieved, for example, by direct electrical contact with the metallic sensor mounting via a contact produced with conducting adhesives, or also via other electrically conducting materials.

For the actual use in monitoring the path of a cut, sensors provided in such a manner with a cover made of a semiconductor material are fitted and aligned in a known manner, in a fixed position relative to the object being measured, that is to say, the saw blade. Deflection movements of the saw blade then result in a change in its distance from the sensor and can be converted by the latter into corresponding measurement signals. This position may, for example, be chosen in a manner such that the sensor or sensors are adjacent to the workpiece during the sawing operation so that the position of the saw blade before it enters the sawed slit and/or after emerging from the latter, is monitored and the path of cut in the workpiece is indirectly inferred therefrom.

The advantages of the sensors according to the invention are, however, particularly important if the fixed position is chosen in the preferred manner so that the path of cut is monitored at least partially through the wafer being produced. A position in the vertex region of the annular hole of the saw blade that is, a position from which, in the sawing operation, as large a region as possible of the wafer being produced is swept by the sensor, has proved particularly suitable. In this case, the sensor is beneficially aligned so that the cutting edge and the lower edge of the sensor coil are at the same height, it generally being adequate if the alignment is carried out with the naked eye, which, according to experience, allows an alignment to within approximately ±0.1 mm to be achieved. In principle, the sensors may, however, also be arranged in positions which are, on the other hand, closer to the outside edge of the saw blade. Arrangements in which the sensor partially projects into the annular hole region are likewise not excluded, satisfactory results usually still being obtained if this fraction does not exceed about 30% of the sensor surface facing the saw blade.

Beneficially, the sensors are so aligned that their cover is oriented as parallel as possible to the saw blade, the alignment expediently being carried out with the saw blade stationary or rotating in an undisturbed and free manner. The most reliable operating results are achieved if, in the working position, the gap between the cover of the sensor and the saw blade corresponds at least to twice the wafer thickness and is within the optimum radius of action which varies depending on the sensor type. With higher gap thicknesses in the limiting range of the normal sensor ranges, the measurement signals are generally too weak for a reliable evaluation, whereas there is a risk in the case of smaller gap thicknesses, that the sensor is damaged, displaced or misaligned if the workpiece is incorrectly presented to the cutting position or in the event of cutting faults. In principle, however, the minimum distance can be reduced to values which are only slightly larger than the intended wafer thickness and maximum distance up to the limit of the radius of action of the particular sensor are also not excluded.

In the actual sawing operation, wafer after wafer can then be removed in a known manner from the workpiece to be sawed up, it being possible to measure and track the saw blade deflection which occurs with high accuracy. It has already been possible to achieve resolutions down to the range of ±1 μm with the aid of the sensor according to the invention. The values found under these circumstances may be used as regulating parameters forming the basis of measures for counteracting the deflection such as, for example, sharpening operations on the cutting edge or changes in the forces in the sawed slit which act on the saw blade axially.

The method is suitable, in particular, for use in sawing rod-shaped or block-shaped workpieces composed of high-resistance, but also low-resistance, silicon with an annular blade. It can likewise be applied to other elementary semiconductors such as germanium or to compound semiconductors such as gallium arsenide, indium phosphide, cadmium telluride or copper indium selenide. The advantages reveal themselves especially when sawing up rods having large diameters exceeding approximately 10 cm into wafers of high geometrical quality since the path of the saw blade can be tracked very accurately, and consequently, regulating operations can be carried out in good time. Particularly beneficial fields of application are sawing methods in which an exact monitoring of the saw blade and reliable measured values are crucial such as, for example, methods in which the deviations of the saw blade measured are smoothed out using a computer control system.

The method and a sensor suitable for carrying out the invention are described in more detail below with reference to the following exemplary embodiment:

A commercial eddy-current sensor (manufactured by Mikroepsilon), which included a two-core copper coil provided with lead wires, embedded in a plastic casting compound and surrounded by a metal mounting and a polyvinyl chloride casing, the free circular flat end face (diameter approximately 2.5 cm) facing the particular object being measured during the measurement, was converted in a manner according to the invention. For this purpose, a wafer having a diameter of about 3 cm was first drilled out of an approximately 400 μm thick wafer composed of p-type doped monocrystalline silicon (specific resistance approximately 0.1 Ω.cm, <100> orientation, wafer diameter approximately 10 cm), whose surface had furthermore been etched after sawing. This wafer was now adhered onto the end face of the sensor concentrically with the coil by means of a water-resistant, electrically conducting adhesive, the gap between the coil and cover, which was completely filled with the casting compound being approximately 0.1 mm, while the short circuit to ground in relation to the sensor was produced by contact with the metal mounting.

The sensor prepared in such a manner was now fitted in the intended measurement position in a commercial annular saw with the aid of a suitable adjustable holder. This position was so chosen that the lower edge of the cover was at the same height as the cutting edge of the annular saw blade. The covered end face was oriented as parallel as possible to the side face of the saw blade, the distance being adjusted to approximately 3.5 mm. The orientation was inspected visually. From the measurement position chosen, it was possible to monitor the path of the saw blade through the wafer being produced during the sawing operation, the measurement range sweep running synchronously with the saw blade from the apex of the workpiece through the center, down to the curve at the base.

The annular saw blade fitted with the sensor according to the invention was now used to saw silicon rods (diameter approximately 15 cm, length approximately 40 cm, specific resistance approximately 10 Ω.cm) into wafers approximately 800 μm thick. The actual sawing operation was at the same time carried out in the normal manner, with a cooling lubricant being fed into the cutting zone and with periodic resharpening of the saw blade, the path of cut being monitored for every wafer with the aid of the sensor and any deviation of the saw blade from its specified position being registered and recorded by means of a plotter.

About 20,000 wafers were sawed by this method without it being possible to detect any malfunction of the measuring operation. The evaluation of the measurement record revealed that the sensor made it possible to monitor the saw blade through the wafer with high accuracy (resolution approximately ±1 μm) and great reliability, and was therefore also suitable for methods in which the measurement signals it delivered were provided as a basis for a computer-controlled re-adjustment of the saw blade and/or workpiece.

In a comparison experiment, 1,000 silicon wafers were sawed with the same annular saw under the same conditions, an identical eddy-current sensor, but without the cover according to the invention being used in the same measurement position. In some sawing operations, this sensor indicated deviations of the saw blade from the specified position of up to 20 μm which did not exist in reality. This sensor was consequently unsuitable for monitoring the path of cut and, in particular for use in computer-controlled sawing methods.

What is claimed is:

1. An eddy-current sensor for monitoring the path of a cut when sawing semi-conductor material into wafers with an annular saw blade, said sensor comprising:
    an eddy-current sensor means; and
    a cover made of semiconductor material secured to said eddy-current sensor means on a side thereof facing the saw blade.

2. An eddy-current sensor according to claim 1, wherein said cover has a thickness in the range of about 100 to 1000 μm.

3. An eddy-current sensor according to claim 1, wherein said cover is made of silicon.

4. An eddy-current sensor according to claim 3, wherein said silicon cover has a specific resistance in the range of about 0.01 to 30 Ω.cm.

5. An eddy-current sensor according claim 1, wherein said cover is made of monocrystalline silicon.

6. An eddy-current sensor according to claim 5, wherein said silicon cover has a specific resistance in the range of about 0.01 to 30 Ω.cm.

7. An eddy-current sensor according to claim 1, further including encapsulation means for encapsulating said eddy-current sensor means on sides thereof not facing the saw blade.

8. A method of monitoring the path of a cut by an annular saw blade through a semiconductor material for the purpose of forming wafers of the semiconductor material, said method comprising the steps of:
    positioning at least one eddy-current sensor in a fixed position relative to the saw blade;

providing a cover made of said semiconductor material on a side of each said eddy-current sensors facing the saw blade;

measuring the distance from the eddy-current sensor to the blade as the blade passes through the semiconductor material;

converting said distance into a signal; and adjusting the position of the blade in accordance with said signal.

9. The method of claim 3 comprising positioning said at least one eddy-current sensor in a fixed position at the side of the saw blade at a distance which exceeds the thickness of the wafer being formed.

10. The method of claim 3 further comprising positioning at least one of said eddy-current sensors in a fixed position at the vertex of the path of the saw blade through the wafer.

* * * * *